J. E. HORNER.
FENDER.
APPLICATION FILED MAR. 21, 1908.
923,654.
Patented June 1, 1909.
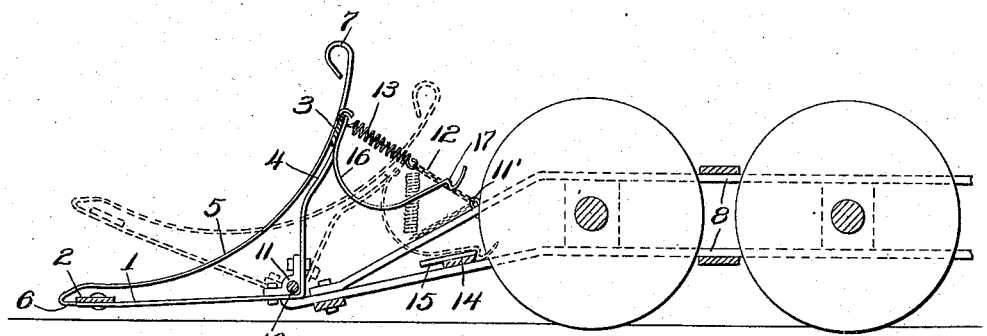
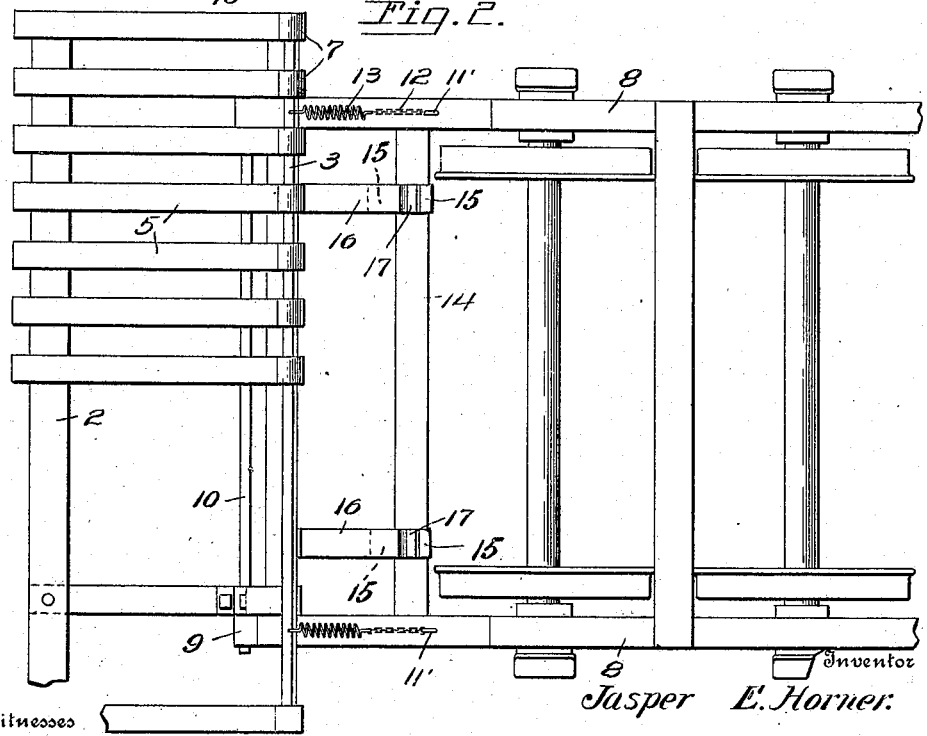
Witnesses
F. C. Gibson
D. W. Gould
Inventor
Jasper E. Horner
By Victor J. Evans
Attorney

UNITED STATES PATENT OFFICE.

JASPER E. HORNER, OF FOREST, OHIO, ASSIGNOR OF ONE-HALF TO DAVID L. HARMAN, OF FOREST, OHIO.

FENDER.

No. 923,654.

Specification of Letters Patent.

Patented June 1, 1909.

Application filed March 21, 1908. Serial No. 422,558.

*To all whom it may concern:*

Be it known that I, JASPER E. HORNER, a citizen of the United States, residing at Forest, in the county of Hardin and State of Ohio, have invented new and useful Improvements in Fenders, of which the following is a specification.

The invention relates to an improvement in fenders designed primarily for use with street cars or the like adapted to be automatically moved to and locked in elevated position upon contact with an object.

The main object of the present invention is the production of a car fender constructed entirely of metal, and adapted to be supported from the car frame in a manner to arrange the receiving end of the fender adjacent the track over which the vehicle is traveling, the fender being so mounted that on picking up an object the force of the contact will rock the fender into a position to elevate its receiving end to prevent escape of the object, the construction including a means for locking the fender in such elevated position until manually released.

The invention will be described in the following specification, reference being had particularly to the accompanying drawings, in which:—

Figure 1 is a sectional view of a portion of a car frame, the fender being shown as connected thereto, being in normal position in full lines and operative position in dotted lines. Fig. 2 is a top plan of the same, a portion of the fender being broken away.

Referring particularly to the drawings, my improved fender is made up in the form of a light metallic framework, including angle strips 1 arranged in spaced relation and connected at their forward ends by cross bars 2 and at their rear or upper ends by cross bars 3, it being understood that the angle strips are of approximately right angular form with the upper portion of the upright curved toward the rear, as shown at 4. The respective cross bars 2 and 3 are connected by spring slats 5, forming the bed of the fender and curving in regular conformation from end to end. The forward ends of the slat strips are preferably formed with return bends, to provide rearwardly extending sections 6, which are directly connected to the forward cross bar 2. By this construction slats overlie and project in advance of the cross bar 2, thereby forming the entire upper exposed surface of the fender of spring strips. The rear or upper ends of the slat strips extend above the rear cross bar 3, being terminally mounted or coiled, as at 7, to afford in effect a stop or obstruction against the rearward rolling of a body picked up by the fender.

The side bars 8 of the truck frame, which serve to support the axles are projected in advance of their usual terminal point and formed to provide bearings 9 in which is mounted a shaft 10 in turn secured by brackets 11 to the angle strips 1 of the fender, whereby said fender is pivotally supported from the truck frame in advance of the forward wheels. Each upper bar 8 of each side of the frame is provided in advance of the forward wheels with an eye 11′, which is connected through the medium of a chain 12 and a coil spring 13 with the upper cross bar 3 of the fender, the length of the respective connections being such as to normally maintain the forward cross bar 2 of the fender spaced a slight distance from the surface over which the vehicle is traveling. The lower cross bars 8 of the frames are connected in advance of the forward wheels by a transversely disposed bar 14, carrying on its upper surface a plurality of plates 15, and the cross bar 3 of the fender is provided at determinate points with spring members 16, terminating in hook form, as at 17. The spring members are so arranged that when the fender has been swung on its pivot in the rearward direction the hooks 17 will engage the plate 15 and maintain the fender so elevated. The relative arrangement of the parts is such that when the hook is engaged with the plate 15 the forward end of the fender will be elevated so as to dispose the same on a plane above the central portion of the bed, whereby an object picked up by the fender will be prevented from rolling off the fender and beneath the car.

In use it will be understood that if the fender strikes an object, the force of the impact will cause the object to be precipitated against the relatively rear and upper portion of the spring bed. This operation will rock the fender on its pivot and cause the hook 17 to engage the plate 15, thus maintaining the fender in elevated or operative position. The fender is to be reset by manual release of the hook, permitting the forward end of the fender to gravitate to the position determined by the length of the connection 12 and 13.

The fender may be constructed of light material, preferably sheet steel, and the slat strips 5 are, of course, to be sufficiently resilient to guard against undue injury to a person picked up by the fender.

Having thus described the invention what is claimed as new, is:—

1. A fender comprising a plurality of right angle strips, front and rear cross bars connecting said strips, and spring slats arranged in spaced parallel relation between and connected to the cross strips, said strips being curved from end to end and at their forward ends being formed with underlying return bends and terminally secured to the front cross bar and at their rear ends projected above the rear cross bar, whereby the forward ends of the slats have spring connection with and are normally spaced from the front cross bar.

2. A fender comprising a plurality of right angle strips arranged for pivotal mounting on a car at the juncture of their arms, and spring slats supported by the terminals of the respective arms of the angle strips, said slats being curved from end to end and projecting in both directions beyond the terminals of the angle strips.

3. A fender comprising a plurality of right angle strips, front and rear cross bars connecting said strips, spring slats arranged in spaced parallel relation between and connected to the cross strips, said strips being curved from end to end and at their forward ends being formed with underlying return bends and terminally secured to the front cross bar and at their rear ends projected above the rear cross bar, whereby the forward ends of the slats have spring connection with and are normally spaced from the front cross bar, and spring hooks secured to and projecting rearwardly from the rear cross bar.

In testimony whereof I affix my signature in presence of two witnesses.

JASPER E. HORNER.

Witnesses:
JAMES W. MARSHALL,
CHAS. O. BEAM.